United States Patent [19]

Schilder et al.

[11] Patent Number: 4,668,168

[45] Date of Patent: May 26, 1987

[54] LUBRICATING AND COOLING ROTARY BEARINGS OF AXIAL BLOWERS

[75] Inventors: Hans Schilder, Zweibrücken; Norbert Kuhn, Giengen, both of Fed. Rep. of Germany

[73] Assignee: J.M. Voith GmbH, Fed. Rep. of Germany

[21] Appl. No.: 739,621

[22] Filed: May 31, 1985

[30] Foreign Application Priority Data

Jun. 14, 1984 [DE] Fed. Rep. of Germany ....... 3422046

[51] Int. Cl.$^4$ .................. F04D 29/06; F04D 29/36
[52] U.S. Cl. .................. 416/157 R; 416/146 A; 416/167; 416/174; 415/88
[58] Field of Search ............ 416/146 A, 174, 245 B, 416/157 R, 157 C, 156, 167; 415/88

[56] References Cited

U.S. PATENT DOCUMENTS

| | | | |
|---|---|---|---|
| 1,510,436 | 9/1924 | Englesson | 416/146 A X |
| 2,477,954 | 8/1949 | Blanc | 416/157 C X |
| 2,844,303 | 7/1958 | Kristiansen | 416/157 C X |
| 2,987,123 | 6/1961 | Liaaen | 416/157 R |
| 3,093,080 | 6/1963 | Tarifa et al. | 415/88 X |
| 3,169,582 | 2/1965 | Schilder et al. | 416/167 |
| 3,367,424 | 2/1968 | Fukasu et al. | 416/174 X |
| 3,791,757 | 2/1974 | Tarifa et al. | 415/88 X |
| 3,794,440 | 2/1974 | McMurtry | 415/88 |
| 3,912,418 | 10/1975 | Andrews et al. | 416/174 |
| 4,046,486 | 9/1977 | Kolb | 416/146 A X |
| 4,219,310 | 8/1980 | Takata et al. | 416/174 X |
| 4,545,734 | 10/1985 | Schilder | 416/146 A |
| 4,603,732 | 8/1986 | Niggemann | 415/88 X |

FOREIGN PATENT DOCUMENTS

| | | | |
|---|---|---|---|
| 947583 | 7/1949 | France | 416/146 A |
| 1256667 | 2/1961 | France | 416/174 |
| 1285127 | 1/1962 | France | 416/146 A |
| 66186 | 8/1950 | Netherlands | 416/146 A |
| 692403 | 6/1953 | United Kingdom | 416/146 A |
| 1061478 | 3/1967 | United Kingdom | 416/146 A |
| 1388562 | 3/1975 | United Kingdom | 415/88 |
| 1512559 | 6/1978 | United Kingdom | 416/146 A |

Primary Examiner—Everette A. Powell, Jr.
Attorney, Agent, or Firm—Ostrolenk, Faber, Gerb & Soffen

[57] ABSTRACT

In an axial blower, a plurality of blades are disposed around a hub and each blade is supported on a respective strut which is rotatable in a pair of radially separated bearings. An axially displaceable disk in the hub is connected with the blades for rotating them. The drive shaft for the rotor is hollow and delivers oil to the disk which in turn delivers it to the rotation levers of the struts. The oil moves successively to the bearings radially outward of the disk and accumulated oil is collected by a scoop at the radially outer bearing. The collected oil is delivered to a collection chamber and is recirculated by a pump back to the hollow shaft. An additional cooling circuit may be provided.

27 Claims, 2 Drawing Figures

LUBRICATING AND COOLING ROTARY BEARINGS OF AXIAL BLOWERS

BACKGROUND OF THE INVENTION

The invention relates to lubricating and, if necessary, cooling the rotary bearings of adjustable rotor blades in rotors of axial blowers, such as hot gas blowers, by means of oil introduced into the rotor. The blower comprises a rotor hub receiving the bearings for the rotating of adjustable rotor blades and a hollow drive shaft supporting the hub through which oil can be introduced into the rotor hub.

Such an axial blower is known from German Auslegeschrift No. 24 37 932 corresponding to U.S. Pat. No. 4,046,486. In that blower, at appropriate time intervals, oil is introduced into the interior of the rotor in a quantity such that a cohesive ring of oil rotating with the rotor is formed. From that ring of oil, the individual strut bearings are supplied with oil. As the introduced oil is removed from the hydraulic adjustable mechanism of the rotor blades, it does not have the optimal properties required for lubricating the bearings. Furthermore, it is not evident to an operator when the oil has been used and has to be replaced. Also, the oil is subject to accelerated aging when the rotor is exposed to increased heating when conveying hot gases.

SUMMARY OF THE INVENTION

An object of the invention is to provide continuous lubricating of the rotary bearings in rotors of axial blowers and particularly in the case of hot gas blowers for protecting the bearings against non-permissible heating. It is further object of the invention to provide a correspondingly designed axial blower.

In an axial blower, a plurality of blades are disposed around a hub and each blade is supported on a respective strut which is rotatable in a pair of radially separated bearings. An axially displaceable disk in the hub is connected with the blades for rotating them. The drive shaft for the rotor is hollow and delivers oil to the disk which in turn delivers it to the rotation levers of the struts. The oil moves successively to the bearings radially outward of the disk and accumulated oil is collected by a scoop at the radially outer bearing. The collected oil is delivered to a collection chamber and is recirculated by a pump back to the hollow shaft. An additional cooling circuit may be provided.

In the invention, the oil is continuously removed from the rotor, is cooled if necessary and is fed again into the rotor. This has the advantage that a circuit of oil, which is independent of other oil hydraulic mechanisms of the axial blower, is used for the lubrication of the rotary bearings. By corresponding oil selection, this circuit enables particularly effective lubrication of the rotary bearings, and in the case of hot gas blowers, it enables an efficient loss of heat from the rotor. Moreover, the condition and the quantity of the oil are also easy to monitor during operation of the blower.

A further development of the invention is for axial blowers having an adjustment disk that is axially displaceable in the rotor hub, wherein the disk has a groove on the peripheral side into which slide blocks disposed on swing levers of the support struts of each blade engage, and whereby each slide block rotatably seats on the ends of the swing levers of the rotor blade struts positioned with radially consecutive bearings in the rotor hub. The oil in the adjustment disk is distributed annularly and is delivered at the slide blocks, from which it flows through the radially inward blade strut bearing, at which a part of the oil is reserved, before it reaches the radially outward strut bearing at which the oil is drawn off. This further development is advantageous to the extent that all the bearings connected with the rotor blades are passed through during this process by utilizing the centrifugal forces acting on the oil.

An axial blower of the invention has the rotor hub engaging, at least indirectly, a scoop member for the oil which is effective during the operation of the blower for removing oil from the vicinity of the radially outer strut bearing. The scoop member is connected with an oil collecting chamber to which a feed pump for the delivery of oil into the drive shaft is also connected. This enables low expenditure on apparatus to produce the oil circuit. For this, a proven mechanism is used so as to scoop the oil rotating with the rotor hub out of this. The scoop feature avoids engagement of oil delivery means or of oil removal means in the bearing components of the rotor hub. At the same time, it enables a liquid-conveying connection to the oil in the hub and a dimensionally favorable housing of the scoop member in the rotor hub.

There is a simply designed feed pump. It is effective during operation of the axial blower, and it conveys a sufficient quantity of oil so as to ensure the circulation of the oil for the lubrication of the rotary bearings.

An additional pumping and cooling circuit is used to more advantage when larger quantities of oil have to be rotated so as to achieve intensive cooling of the bearings, in particular in rotors of hot gas blowers.

A pump is provided at the drive shaft which transports a sufficient quantity of oil from the collecting chamber and which the rotor hub delivers so as to provide bearing lubrication there.

Other objects and features of the invention can be learned from an embodiment of the invention which is described below with reference to the accompanying drawings.

DESCRIPTION OF A PREFERRED EMBODIMENT

Figure 1:
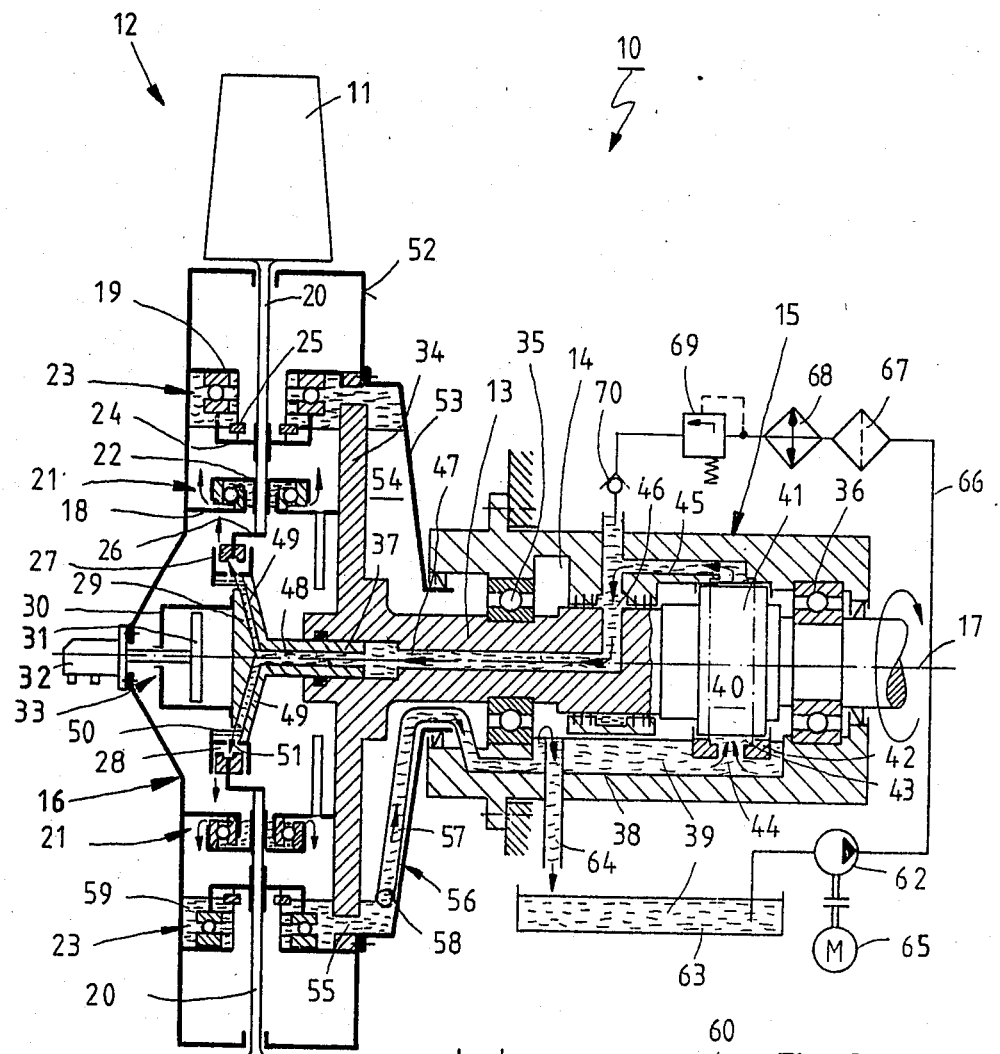
FIG. 1 is a schematic cross-section through an axial blower with a circuit of oil according to the invention to supply the rotor blade bearings.

FIG. 1 shows an axial blower 10 whose rotor 12 has rotation orientation adjustable rotor blades 11. Its drive shaft 13 is in the housing 14 of the rotor bearing 15. The rotor 12 has a rotatable, disk-shaped, hollow hub 16, and the radially extending rotor blades 11 are distributed uniformly around the hub periphery.

Into the hub 16 are inserted two tubular walls 18 and 19 which extend axially across the hub and run concentrically to the axis 17 of the blower 10. The walls 18 and 19 are radially spaced apart. These walls are bored through and pierced by support struts 20 of the rotor blades 11, which struts extend into the hub 16. The rotor blades rotate together with the hub of the rotor. In the region of each rotor blade strut 20, the radially inward hub wall 18 carries a respective bearing 21, which encircles the strut 20 and, in turn, is embraced by a bearing box 22 that is seated securely on the strut.

Bearing 21 is particularly adapted to absorb axial thrust along the rotor axis. Each strut 20 is also supported against the radially outward wall 19 of the rotor hub 16 by a bearing 23 on the wall 19, which encircles the strut 20, and by using a dish-shaped support part 24 that is securely seated on the strut. The bearing 23 is particularly adapted to absorb thrust axially of the strut, which is also radial of the rotor axis. Inside each external strut bearing 23, the wall 19 is indented in a shell shape against the blower axis 17 and sealed with a seal 25 against the support part 24. As can be seen in FIG. 1, the wall 19 traps oil that has flowed to the outer bearing 23. The seal 25 at the support part 24 prevents oil from leaving that entrapping region at wall 19. Continuously outwardly flowing oil would build up. But, it is removed by below described removal scoop 56.

On its radially inward end, each rotor blade strut 20 has a swing lever 26 or crank. At its end away from the blade 11, the lever 26 carries a pivoted slide block 27. All slide blocks 27 of the swing levers 26 engage in a peripheral groove 28 of a rotatable adjustment disk 29 arranged at the middle of the rotor hub 16. A cylinder 30 is arranged on the adjustment disk 29 coaxially to the blower axis 17. This cylinder receives a piston 31 which is fixed relative to the rotor hub 16. A rotary transmission 32 mounted outside of and on the rotor hub 16 selectively provides the cylinder 30 on both sides of the piston 31 with hydraulic oil. The servomotor 33 comprised of the cylinder 30 and the piston 31 can cause axial displacement of the adjustment disk 29, which sets the angle of the rotor blades 11 relative to the blower axis 17 via the respective slide blocks 27, swing levers 26 and rotor blade struts 20.

On the hub 16 of the rotor 12 is fixed the drive shaft 13 having a flange 34 at the hub 16. The drive shaft 13 is rotatably supported by roller bearings 35, 36 in the stationary bearing housing 14. The shaft 13 passes through the housing 14 and is connected to a motor, which is not shown, for rotating the rotor 12 in the direction of the arrow marked at the right shaft end. At the rotor side end of the drive shaft 13, the adjustment disk 29, which is axially movable by means of the servomotor 33, engages with a formed-on journal 37 into the drive shaft.

Moreover, the bearing housing 14 serves as a collection chamber 38 for oil 39 for lubricating the bearings of the slide block 27 and the strut bearings 21 and 23 rotating with the rotor 12. The oil is guided in the rotor hub. The oil also serves for lubricating the roller bearings 35 and 36 of the drive shaft 13 in the bearing housing 14. A feed pump 40 conveys the oil 39. The pump is comprised of a collar 41 on the drive shaft 13 and of a fixed housing 42 encasing this collar. Between the periphery of the collar 41 and the housing 42 is formed an annular gap 43 of small radial extension. The gap is connected by a suction aperture 44 in the oil 39 with the oil collection chamber 38. When the axial blower 10 operates, the collar 41 of the drive shaft 13 in the annular gap 43 conveys oil, which is wiped off in the area of the collar opposite the suction aperture 44, and is led into a conduit 45 of the bearing housing 14. Such a pump is known from U.S. Pat. No. 3,733,144.

The conduit 45 opens out into a rotary transmission 46 between the bearing housing 14 and the drive shaft 13. From there the oil 39 flows through a longitudinal bore hole 47 in the drive shaft 13 to the journal 37 of the adjustment disk 29. The journal 37 also has a longitudinal bore hole 48 from which the oil 39 is discharged to guide conduits 49 running radially outwards. The oil flows into a channel 50 of the adjustment disk 29 which opens radially inwardly, in which oil is distributed as a ring of uniform thickness. Through a plurality of bore holes 51 distributed over the periphery of the channel 50, the oil 39 is discharged into the groove 28 of the adjustment disk 29, where it lubricates the slide blocks 27 on the swing levers 26 of the rotor blade strut 20. From there, the oil 39 meets the radially inward wall 18 of the rotor hub 16 and enters the bearing boxes 22 of the strut bearings 21. The constantly flowing oil 39 causes the bearing boxes 22 to overflow so that a ring of oil is formed in the region of the radially outward strut bearings 23.

With the operations of the axial blower 10, the flooding of slide blocks 27 and of the strut bearings 21 and 23 consequently ensures their permanent lubrication.

On the rear end 52 of the rotor hub 16 which faces toward the bearing housing 14, a dish-shaped component 53 is attached. It forms a rotation-symmetrical chamber 54. This is connected at its radially outward end region with the interior of the rotor hub 16 receiving the external strut bearings 23 through bore holes 55. The chamber 54 receives a scoop member 56, comprising a tube 57 fixed against rotation on the bearing housing 14, which extends approximately radially outward within the chamber 54. At its radially outward end section, the tube 57 is directed against the rotational direction of the rotor 12, and it there has an inlet aperture 58 for the oil 39. The other end section of the tube 57 opens out into the oil collection chamber 38 of the bearing housing 14. The radial position of the inlet aperture 58 of the tube 57 of the scoop member 56 determines the course of the oil ring level in the height of the seals 25 of the radially outward strut bearings 23. The oil received during operation of the axial blower 10 from the scoop member 56 in the ring of oil 59 is transported into the oil collection chamber 38. There it lubricates the roller bearings 35 and 36 of the drive shaft 13 of the rotor 12. The rotor mounting may alternatively be formed of sliding bearings. By the continual drawing off of the oil 39 from the hub 16 of the rotor 12 into the bearing housing 14, the oil circuit is consequently closed.

In a modification of the above described embodiment, a disk (not shown) running radially and situated in the chamber 54 may also be used as the scoop member. It has inlet apertures for oil on its peripheral side. From these apertures, conduits proceed which, in the area of the disk center, open into the oil collection chamber 38 of the bearing housing 14 on which the disk is fixed. Such scoop members are described in German Patent Specification No. 1 046 423.

Figure 2:
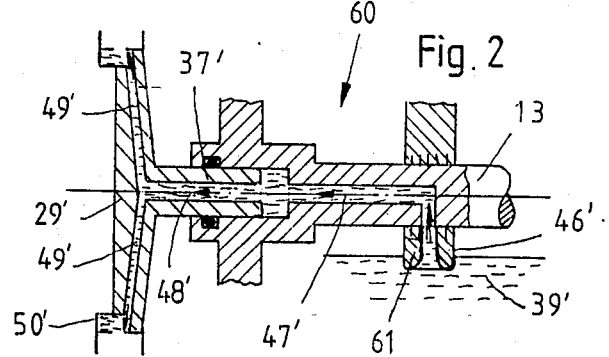
FIG. 2 is a schematic cross-section of another feed appliance for the oil.

Instead of the feed pump 40, an oil conveying device 60 in accordance with FIG. 2 may also be used. This differs from the embodiment in FIG. 1 in that a rotary transmission 46' with a pump intake 61 dipping in the oil 39' of the oil collection chamber is defined on the drive shaft 13'. From there, the oil 39' flows through the longitudinal bore holes 47', 48' of the drive shaft 13' and of the journal 37' of the adjustment disk 29'. The adjustment disk 29' has radially running oil supply conduits 41' which open out into the channel 50' of the disk. Oil 39' is conveyed by the outlet of the oil supply conduits 49' lying on a greater radius than the inlet of the pump intake 61 immersed in the oil 39'.

Through the transport of hot gases, the rotor 12 of the axial blower 10 experiences high thermal stress. It is therefore necessary to cool the rotor hub 16 and particularly the strut bearings 21 and 23. For this purpose, an external feed pump 62 is connected to the bearing housing 14 of the blower 10. The pump 62 draws in oil from a storage reservoir 63 which is supplied with oil 39 from the oil collection chamber 38 of the bearing housing 14 via an overflow tube 64. The feed pump 62, which is driven by a motor 65, transports the hot oil 39 through a filter 67 sitting in the suction of a line 66 and through a cooler 68. In this, the heat received in the rotor 12 is removed from the oil. The cold oil is subsequently supplied through a pressure limiting valve 69 and a relief valve 70 of the rotary transmission 46 of the bearing housing 14, so as to be fed into the drive shaft 13 and to be supplied to the rotor 12.

The invention may also be used in multistage axial blowers, wherein the rotor hub is constructed as a drum-shaped body on which the individual blower stages, with their rotor blades, are arranged axially spaced. Instead of the adjustment disk, a tube guided axially in the hub is used. It has a groove for the slide blocks of the corresponding rotor blade struts on the peripheral side in the region of each blower stage. A distribution conduit extending inside the tube dispenses into each groove the oil supplied by a feed pump, to lubricate the rotor bearings. A scoop member conveys the oil from the rotor hub into the oil collection chamber of the rotor bearing housing so as to complete the circulation of the oil.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. An axial blower comprising a rotor and a rotor hub attached to and rotatable with the rotor;

a plurality of rotor blades projecting radially out of the hub, a respective strut being provided for each blade and the blades being supported on their respective struts which extend from the blades radially into the hub; the blades and their struts being rotatable in their orientations with respect to the hub, a respective swing lever being provided for each strut for swinging the orientation of the blade with respect to the hub;

an axially displaceable disk in the hub, the disk having receiving means for receiving the swing levers of the struts, such that axial displacement of the disk swings the swing levers for rotating the struts and the blades;

a hollow drive shaft for the rotor for rotating the rotor, the drive shaft communicating with the disk and being hollow for delivering oil to the disk; the disk, in turn, communicating through the receiving means with the swing levers for delivering oil to the swing levers where the swing levers meet the receiving means of the disks;

a respective bearing inside the hub for each strut for supporting the strut, the bearing supporting the strut at a location that is spaced radially outward from the disk, and the bearing being for enabling rotation of the strut and the blade with respect to the hub;

the drive shaft delivering oil to the disk sufficiently for the disk to permit that oil to also move from the receiving means to the bearing;

oil removal means at the bearing for removing oil from the hub as the oil gathers in the vicinity of the bearing; said oil removal means comprising a scoop member which includes a tube which is fixed against rotation with respect to the rotating hub, the tube having an inlet aperture at its radially outward end for removing said oil from adjacent said bearing; and recirculation means communicating with the radially inward end of the tube of the oil removal means for recirculating removed oil back to the hollow drive shaft.

2. The axial blower of claim 1, further comprising a second respective bearing inside the hub for each strut and the second bearing being located radially inward of the first-mentioned respective bearing for that strut, the second bearing is also for supporting that strut for enabling rotation of the strut and the respective blade with respect to the hub;

the second bearing being so placed and shaped that oil from the disk moving to the first bearing first contacts the second bearing and then moves onto the first bearing.

3. The axial blower of claim 2, further comprising means at both of the first and the second bearings for retaining oil thereat, while the second bearing permits some of the oil to move to the first bearing.

4. The axial blower of claim 2, wherein each receiving means comprises a groove in the disk, and each swing lever has a respective slide block on the swing lever which is received in the receiving means groove of the disk.

5. The axial blower of claim 2, further comprising recirculation means connected with the removal means for recirculating removed oil back to the hollow drive shaft.

6. The axial blower of claim 5, wherein the oil removal means comprises a scoop for removing oil that is held at the first bearing.

7. The axial blower of claim 5, further comprising an oil collection chamber in said hub which is spaced from said bearings and has therein the scoop member of the removal means for receiving oil; and a pump connected with the collection chamber for pumping oil from that chamber for delivering oil into the hollow drive shaft.

8. The axial blower of claim 6, wherein the rotor hub has defined in it a rotation symmetrical chamber toward an axial side thereof and in which the scoop is disposed.

9. The axial blower of claim 6, wherein the scoop comprises a fixed tube extending from the region of the first bearing toward the rotor axis, and the scoop tube having an inlet at the first bearing; and further comprising an oil collection chamber having the tube therein for receiving the oil.

10. The axial blower of claim 6, wherein the scoop comprises a disk extending at least approximately radially and having a peripheral side with inlet apertures thereinto, the inlet apertures being located at the first bearing for receiving oil there; and further comprising an oil collection chamber having the scoop therein for receiving oil.

11. The axial blower of claim 7, wherein the pump comprises a collar seated on the drive shaft and the collar including a fixed housing which passes through a further oil collection chamber on the peripheral side of the collar for receiving oil therefrom; an oil wiper for wiping oil from the collar and for delivering the oil to the hollow of the drive shaft for transmission to the disk.

12. The axial blower of claim 7, further comprising an additional feed pump having a suction side connected with the oil collection chamber and a pressure side connected into the hollow of the drive shaft; an oil cooler connected with the additional feed pump between the oil collection chamber and the hollow of the drive shaft.

13. The axial blower of claim 1, wherein the disk has a radially directed oil transmitting conduit therethrough for delivering oil to the receiving means.

14. The axial blower of claim 7, wherein the disk has a radially directed oil transmitting conduit therethrough for delivering oil to the receiving means;
the pump having an intake that dips in the oil collection chamber, and the disk being so sized with respect to the drive shaft that the outlet of the oil transmitting conduit of the disk lies on a greater radius than the entrance to the pump intake.

15. The axial blower of claim 2, further comprising means in the hub for axially displacing the disk with respect to the hub and the drive shaft.

16. An axial blower comprising a rotor and a rotor hub attached to and rotatable with the rotor;
a plurality of rotor blades projecting radially out of the hub, a respective strut being provided for each blade and the blades being supported on their respective struts which extend from the blades radially into the hub; the blades and their struts being rotatable in their orientations with respect to the hub, a respective strut swinging means being provided for each strut for swinging the orientation of the blade with respect to the hub;
axially displaceable means in the hub, including receiving means for the strut swinging means of the struts, such that axial displacement of the displaceable means swings the swinging means for rotating the struts and the blades;
oil delivery means in the receiving means, the receiving means in turn communicating with the strut swinging means for delivering oil to the swinging means which is where the struts meet the axially displaceable means;
a respective bearing inside the hub for each strut for supporting the strut, the bearing supporting the strut at a location that is spaced radially outward from the receiving means, and the bearing being for enabling rotation of the strut and the blade with respect to the hub;
the oil delivery means delivering oil to the receiving means in sufficient quantity that the oil is also permitted to move from the receiving means to the bearing;
oil removal means at the bearing for removing oil from the hub as the oil gathers in the vicinity of the bearing;
said oil removal means comprising a scoop member which includes a tube which is fixed against rotation with respect to the rotating hub, the tube having an inlet aperture at its radially outward end for removing said oil from adjacent said bearing, a portion of said tube at the radially outward end thereof being directed against the direction of rotation of said hub for enhancing the removal of oil; and
recirculation means communicating with the radially inward end of the tube of the oil removal means for recirculating removed oil back to the oil delivery means;
said tube of said scoop member extending integrally from said radially outward end thereof to said recirculation means, said recirculation means being outside said rotating hub and fixed against rotation with respect thereto.

17. The axial blower of claim 16, further comprising a second respective bearing inside the hub for each strut and the second bearing being located radially inward of the first-mentioned respective bearing for that strut, the second bearing is also for supporting that strut for enabling rotation of the strut and the respective blade with respect to the hub;
the second bearing being so placed and shaped that oil from the receiving means moving to the first bearing first contacts the second bearing and then moves onto the first bearing.

18. The axial blower of claim 17, further comprising means at both of the first and the second bearings for retaining oil thereat, while the second bearing permits some of the oil to move to the first bearing.

19. The axial blower of claim 17, further comprising recirculation means connected with the removal means for recirculating removed oil back to the oil delivery means.

20. The axial blower of claim 19, further comprising an oil collection chamber in said hub which is spaced from said bearings and has therein the scoop member of the removal means for receiving oil ; and a pump connected with the collection chamber for pumping oil from that chamber and for delivering oil to the oil delivery means.

21. The axial blower of claim 20, the pump having a suction side connected with the oil collection chamber and a pressure side connected to the oil delivery means; and further comprising an oil cooler connected with the feed pump between the oil collection chamber and the oil delivery means.

22. An axial blower comprising a rotor and a rotor hub attached to and rotatable with the rotor;
a plurality of rotor blades projecting radially out of the hub, a respective strut being provided for each blade, the blades being supported on their respective struts which extend from the blades radially into the hub; the blades and their struts being rotatable in their orientations with respect to the hub, a respective swing lever being provided for each strut for swinging the orientation of the blade with respect to the hub;
an axially displaceable disk in the hub, the disk having receiving means for receiving the swing levers of the struts, such that axial displacement of the disk swings the swing levers for rotating the struts and the blades;
a hollow drive shaft for the rotor for rotating the rotor, the drive shaft communicating with the disk and being hollow for delivering oil to the disk; the disk, in turn, communicating through the receiving means with the swing levers for delivering oil to the swing levers where the swing levers meet the receiving means of the disks;
a respective first bearing inside the hub for each strut for supporting the strut, the first bearing supporting the strut at a location that is spaced radially outward from the disk, the first bearing being for enabling rotation of the strut and the blade with respect to the hub;

the drive shaft delivering oil to the disk sufficiently for the disk to permit that oil to also move from the receiving means to the first bearing;

a second respective bearing inside the hub for each strut, the second bearing being located radially inward of the first respective bearing for that strut, the second bearing being also for supporting that strut for enabling rotation of the strut and the respective blade with respect to the hub;

the second bearing being so placed and shaped that oil from the disk moving to the first bearing first contacts the second bearing and then moves onto the first bearing;

oil removal means comprising a scoop at the first bearing for removing oil from the hub as the oil gathers in the vicinity of the first bearing;

said scoop including a tube which is fixed against rotation with respect to the rotating hub, the tube having an inlet aperture at its radially outward end for removing said oil from adjacent said first bearing, a portion of said tube at the radially outward end thereof being directed against the direction of rotation of said hub for enhancing the removal of oil; and recirculation means communicating with the radially inward end of the tube of the scoop of the oil removal means for recirculating removed oil back to the hollow drive shaft;

said tube of said scoop extending integrally from said radially outward end thereof to said recirculation means, said recirculation means being outside said rotating hub and fixed against rotation with respect thereto.

23. An axial blower comprising a rotor and a rotor hub attached to and rotatable with the rotor;

a plurality of rotor blades projecting radially out of the hub; a respective strut being provided for each blade, the blades being supported on their respective struts which extend from the blades radially into the hub; the blades and their struts being rotatable in their orientations with respect to the hub, a respective strut swinging means being provided for each strut for swinging the orientation of the blade with respect to the hub;

axially displaceable means in the hub, including receiving means for the strut swinging means of the struts, such that axial displacement of the displaceable means swings the swinging means for rotating the struts and the blades;

oil delivery means in the receiving means, the receiving means in turn communicating with the strut swinging means for delivering oil to the swinging means which is where the struts meet the axially displaceable means;

a respective first bearing inside the hub for each strut for supporting the strut, the first bearing supporting the strut at a location that is spaced radially outward from the receiving means, the first bearing being for enabling rotation of the strut and the blade with respect to the hub;

a second respective bearing inside the hub for each strut, the second bearing being located radially inward of the first respective bearing for that strut, the second bearing being also for supporting that strut for enabling rotation of the strut and the respective blade with respect to the hub;

the second bearing being so placed and shaped that oil from the disk moving to the first bearing first contacts the second bearing and then moves onto the first bearing;

the oil delivery means delivering oil to the receiving means in sufficient quantity that the oil is also permitted to move from the receiving means to the first and second bearings;

oil removal means at the first bearing for removing oil from the hub as the oil gathers in the vicinity of the first bearing; said oil removal means comprising a scoop member which includes a tube which is fixed against rotation with respect to the rotating hub, the tube having an inlet aperture at its radially outward end for removing said oil from adjacent said first bearing, a portion of said tube at said radially outward end thereof being directed against the direction of rotation of said hub for enhancing the removal of oil; and recirculation means communicating with the radially inward end of the tube of the oil removal means for recirculating removed oil back to the oil delivery means; said tube extending integrally from said radially outward end thereof to said recirculation means, said recirculation means being outside said rotating hub and fixed against rotation with respect thereto;

said recirculation means including an oil collection chamber in said hub which is spaced from said bearings and has therein the scoop member of the removal means for receiving oil; and a pump connected by said scoop member with the collection chamber for pumping oil from that chamber and for delivering oil to the oil delivery means.

24. An axial blower as in claim 1, wherein a portion of said tube at the radially outward end thereof is directed against the direction of rotation of said hub for enhancing the removal of oil.

25. An axial blower as in claim 1, wherein said tube extends integrally from the radially outward end thereof to said recirculation means, said recirculation means being outside said rotating hub and fixed against rotation with respect thereto.

26. An axial blower as in claim 23, wherein said oil collection chamber is formed by a dish-shaped rotation-symmetrical component fixed to said rotor hub, said chamber communicating with the vicinity of said first bearing for receiving oil therefrom.

27. An axial blower as in claim 26, said axial blower further comprising a drive shaft for rotating the rotor, said oil collection chamber being spaced from said bearings by a radial flange fixed for rotation with said drive shaft and with said rotor hub, said flange having an aperture therein for communicating said hub with said oil collection chamber.

* * * * *